United States Patent [19]
Murray

[11] Patent Number: 5,092,515
[45] Date of Patent: Mar. 3, 1992

[54] ENVELOPE

[76] Inventor: Thomas Murray, 28 Patrician Villas, Dublin, Ireland

[21] Appl. No.: 633,998

[22] Filed: Dec. 26, 1990

Related U.S. Application Data

[63] Continuation-in-part of Ser. No. 448,844, Dec. 12, 1989, abandoned.

[30] Foreign Application Priority Data

Dec. 13, 1988 [IE] Ireland .................................. 3721/88

[51] Int. Cl.$^5$ ....................... B65D 27/06; B65D 27/34
[52] U.S. Cl. ..................................................... 229/302
[58] Field of Search .................... 229/73; 206/610, 618

[56] References Cited

U.S. PATENT DOCUMENTS

| 769,536 | 9/1904 | Dixon | 229/73 |
|---|---|---|---|
| 1,064,302 | 6/1913 | Donohue | 229/73 |
| 1,142,349 | 6/1915 | Merrill | 206/610 |
| 1,200,735 | 10/1916 | Klein | 206/610 |
| 1,575,769 | 3/1926 | Kaye | 229/73 |
| 1,717,698 | 6/1929 | Lawhorn | 229/73 X |
| 1,953,192 | 4/1934 | Rossiter | 229/73 |
| 4,382,539 | 5/1983 | Kronman | 229/73 |
| 4,730,768 | 3/1988 | Gendron | 229/73 |

FOREIGN PATENT DOCUMENTS

| 641751 | 12/1963 | Belgium | 206/618 |
|---|---|---|---|
| 355502 | 11/1905 | France | 229/73 |
| 786542 | 9/1935 | France | 206/618 |
| 2383083 | 11/1978 | France | 229/73 |
| 2612887 | 9/1988 | France | 229/73 |
| 3058 | 8/1912 | United Kingdom | 229/73 |
| 212712 | 3/1924 | United Kingdom | 229/73 |

Primary Examiner—Stephen Marcus
Assistant Examiner—Jes F. Pascua

[57] ABSTRACT

An envelope comprises a contents-receiving body portion and first and second closure flaps. The second closure flap is folded into the body portion, and the first closure flap is foldable about a fold line to close the body portion with the second closure flap accommodated therein. The envelope further comprises two perforated lines respectively disposed one on either side of the fold line and being substantially parallel to and equally spaced from the fold line. The body portion of the envelope is openable by tearing along the perforated lines, and the envelope is re-usable by lifting the second closure flap out of the body portion. As an alternative, one of the perforated lines may comprise a line partially perforated along each side of a central opening or slit.

6 Claims, 8 Drawing Sheets

ENVELOPE

This application is a continuation-in-part of application Ser. No. 07/448,844 filed Dec. 12, 1989, now abandoned, the entire contents of which are hereby incorporated by reference.

BACKGROUND OF THE INVENTION

This invention relates to a construction of an envelope. The invention has a particular application in providing a construction of an envelope which is adapted for postal use in such circumstances where the original addressor requires or desires to receive a reply from the original addressee and to facilitate or at least encourage such a reply from the addressee provides the addressee with a return addressed envelope.

It is well established practice that where an addressor requires the addressee to reply, a separate addressed envelope is enclosed with the correspondence and/or documents. This is sent to the addressee, a practice commonly used by many organisations such as credit card companies, marketing companies, government departments, insurance companies, professional associations and the like organisations where a reply or a cheque payment is required. This practice demands that the cost of a second reply envelope is incurred.

SUMMARY OF THE INVENTION

The present invention is directed towards both simplifying the known practice and reducing costs by providing a construction of a single envelope adapted to serve the dual purpose of acting as the original envelope and the reply envelope. The present invention also provides a construction of a single envelope adapted to serve the dual purpose of acting as the original envelope and the reply envelope and wherein the original envelope is from the viewpoint of postal authorities an open envelope and therefore attracts a lower postal rate to that of the normal closed envelope.

Accordingly, the present invention provides an envelope comprising a contents-receiving body portion and first and second closure flaps, the second closure flap being folded into the body portion, and the first closure flap being foldable about a fold line to close the body portion with the second closure flap accommodated therein, the envelope further comprising two lines of weakness respectively disposed one on either side of said fold line and being substantially parallel to and equally spaced from the fold line, the body portion of the envelope being openable by tearing along the lines of weakness and the envelope being re-usable by lifting the second closure flap out of the body portion.

The present invention also provides a blank for folding to form an envelope, comprising first and second contiguous centre sections divided by a first fold line along which one centre section may be folded over upon the other centre section to form a contents-receiving body portion of the envelope, a first closure flap contiguous with the first centre section and divided therefrom by a second fold line remote from the first fold line, two lines of weakness respectively disposed one on either side of the second fold line and being substantially parallel to and equally spaced from the second fold line, and a second closure flap contiguous with the second centre section and divided therefrom by a third fold line remote from the first fold line, the second closure flap being capable of being accommodated within the body portion of the envelope and the first closure flap being capable of closing the body portion of the envelope with the second closure flap accommodated therein, the body portion of the envelope being openable by tearing along the lines of weakness.

The present invention also provides an envelope comprising a contents-receiving body portion and first and second closure flaps, the second closure flap being folded into the body portion, and the first closure flap being foldable about a fold line to close the body portion with the second closure flap accommodated therein, the envelope further comprising two lines of weakness respectively disposed one on either side of the said fold line and being substantially parallel to and equally spaced from the fold line, the line of weakness nearest the free edge of the first closure flap having a central open portion whereby the envelope in its first use is an open envelope, the body portion of the envelope being fully openable by tearing along the lines of weakness and the envelope being re-usable by lifting the second closure flap out of the body portion.

The present invention accordingly also provides a second blank construction for folding to form an envelope, comprising first and second contiguous centre sections divided by a first fold line along which one centre section may be folded over upon the other centre section to form a contents-receiving body portion of the envelope, a first closure flap contiguous with the first centre section and divided therefrom by a second fold line remote from the first fold line, two lines of weakness respectively disposed one on either side of the second fold line and being substantially parallel to and equally spaced from the second fold line, the line of weakness nearest the free edge of the first closure member having a central open portion and a second closure flap contiguous with the second centre section and divided therefrom by a third fold line remote from the first fold line.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will be understood from the description of embodiments thereof given by way of example only with reference to the accompanying drawings in which.

DETAILED DESCRIPTION OF THE PREFERRED EMBODIMENTS

Figure 1:
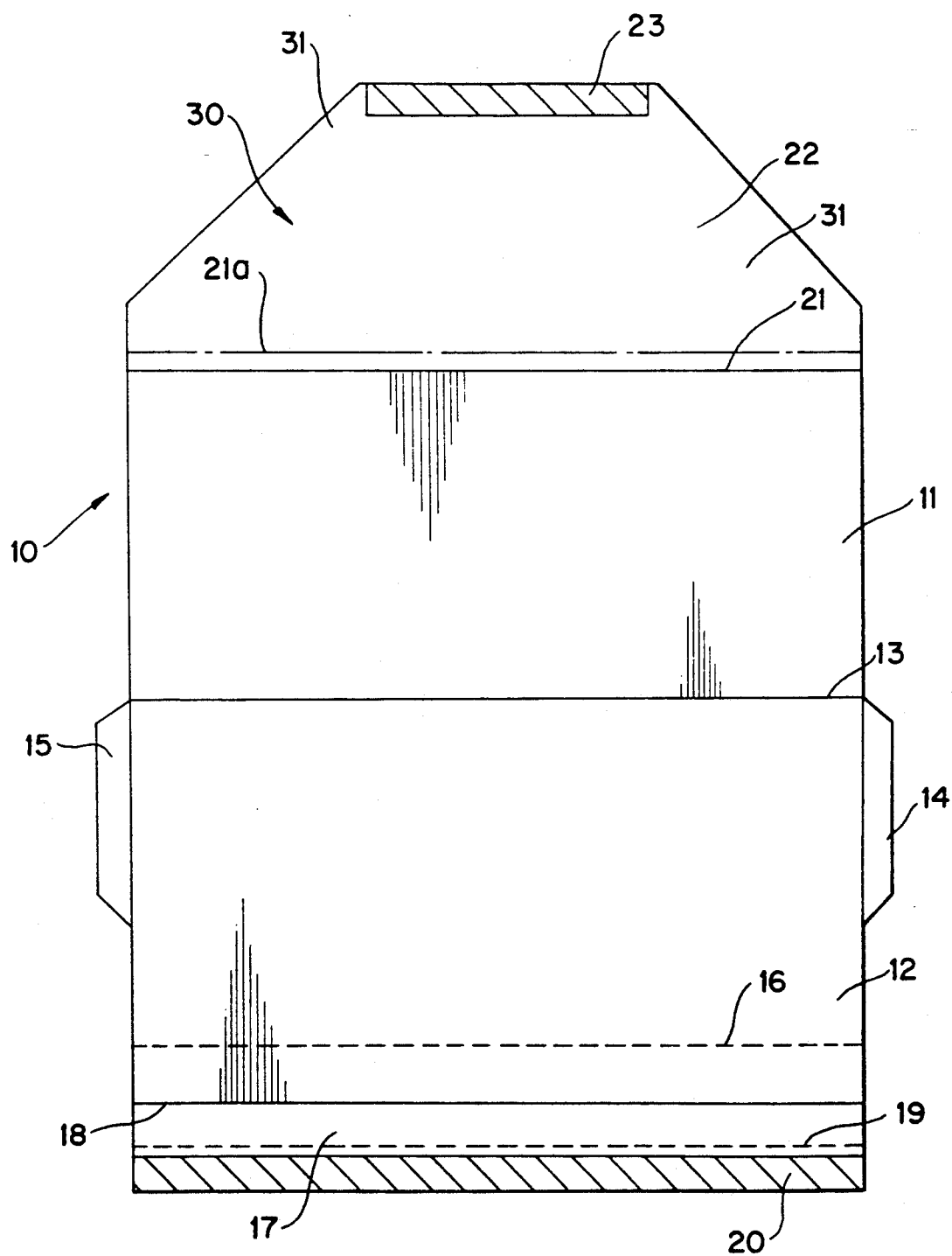
FIG. 1 is a plan view of a first paper blank from which an envelope of the present invention may be formed.

Referring to FIG. 1 of the accompanying drawings, a paper blank 10 from which an envelope is formed is shown. The blank 10 has two contiguous rectangular centre sections 11 and 12 divided by a fold line 13. The centre section 12 has on each of its shorter side edges a respective gummed flap 14 or 15. The longer edge of the centre section 12 remote from the fold line 13 is defined by a fold line 18 which divides the centre section 12 from a contiguous first closure flap 17 having a gummed portion 20 at its free edge. The longer edge of the centre section 11 remote from the fold line 13 is defined by a fold line 21 which divides the centre section 11 from a contiguous second closure flap 22 having a gummed portion 23 at its free edge.

Two perforated lines 16 and 19 are provided one on either side of the fold line 18, the perforated lines 16 and 19 being substantially parallel to and equally spaced from the fold line 18, and the perforated line 16 being substantially the same distance from the fold line 13 as the fold line 21.

Figure 2:
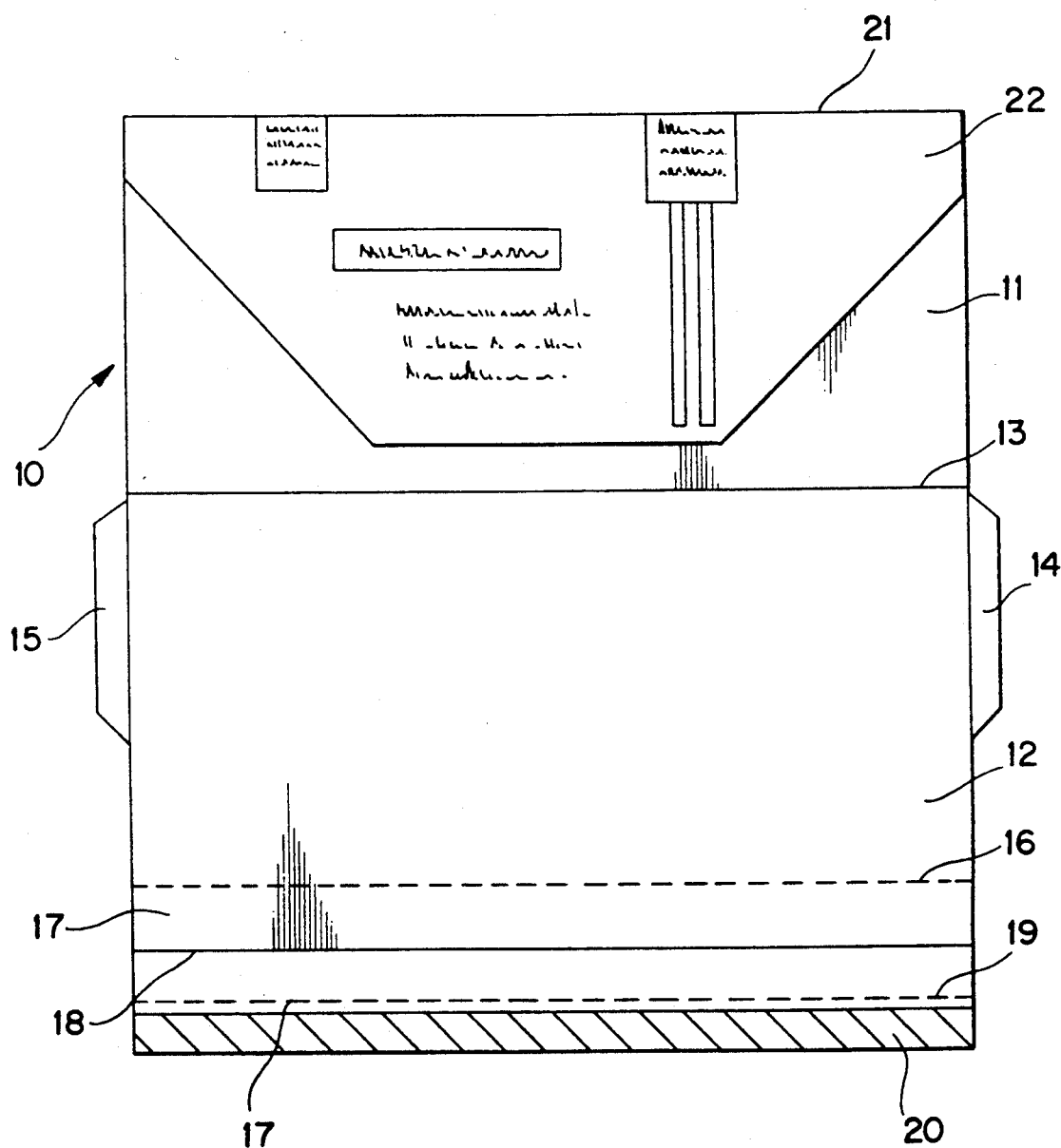
FIG. 2 is a plan view of the paper blank after the first fold in the forming of the envelope.

In forming an envelope from the paper blank 10 of FIG. 1, the first step is to fold the second closure flap 22 about the fold line 21 over upon the centre section 11 as shown in FIG. 2 of the accompanying drawings. It will be noted that the folded over second closure flap 22 has printed thereon the name, address and if appropriate the postage licence for the use of the envelope as a reply envelope.

Figure 3:
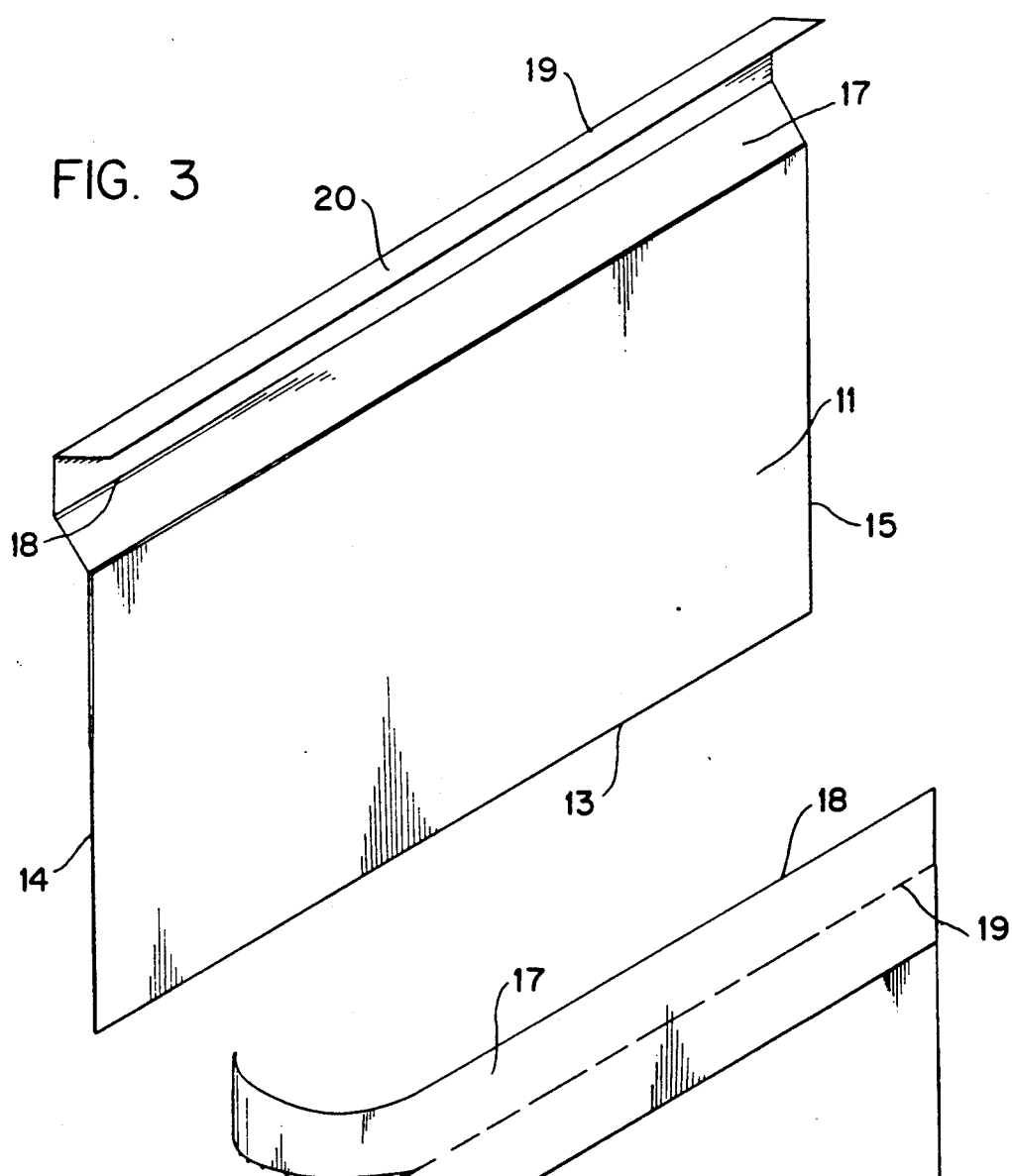
FIG. 3 is a perspective view of the formed envelope with the flap of the envelope open.

The subsequent steps in the forming of the envelope are to fold the centre section 11 about the fold line 13 over upon the centre section 12 to form a contents receiving body portion of the envelope, to fold and gum the flaps 14 and 15 down onto the rear and now exposed face of the centre section 11 to close the sides of the body portion, and to fold the first closure flap 17 about the fold line 18 to form the final envelope as shown in FIG. 3 of the accompanying drawings. It will be noted that the second closure flap 22 is accommodated within the body portion of the envelope formed by the sections 11 and 12.

In order to seal contents into the body portion of the envelope, one simply folds the closure flap 17 about fold line 18 and presses down the gummed edge portion 20 to secure the portion 20 to the face of the centre section 11.

Figure 4:
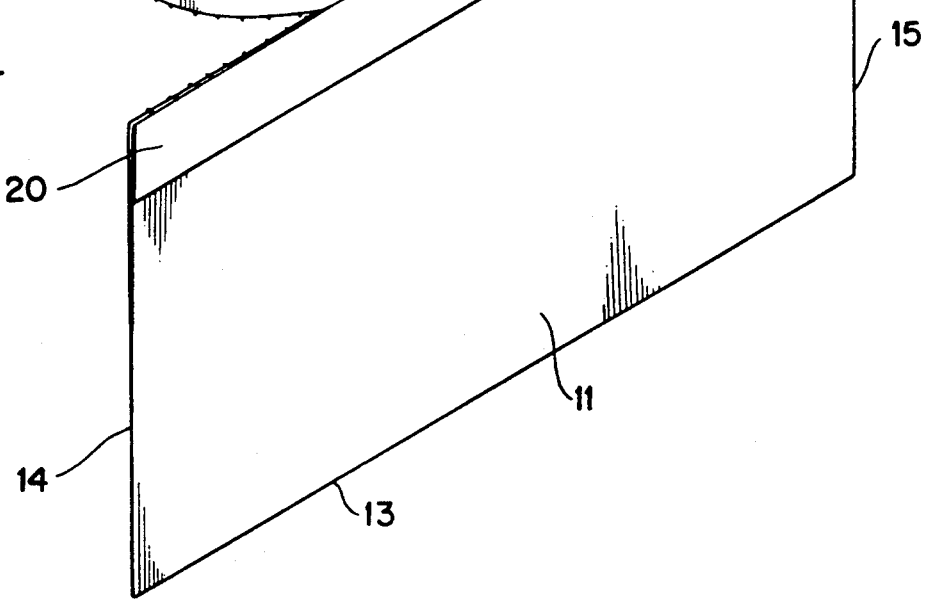
FIG. 4 is a perspective view of the sealed envelope in a partially opened position.

When the envelope is delivered, the addressee can open the envelope by tearing off the top of the envelope along the perforated lines 16 and 19, as shown in FIG. 4.

Figure 5:
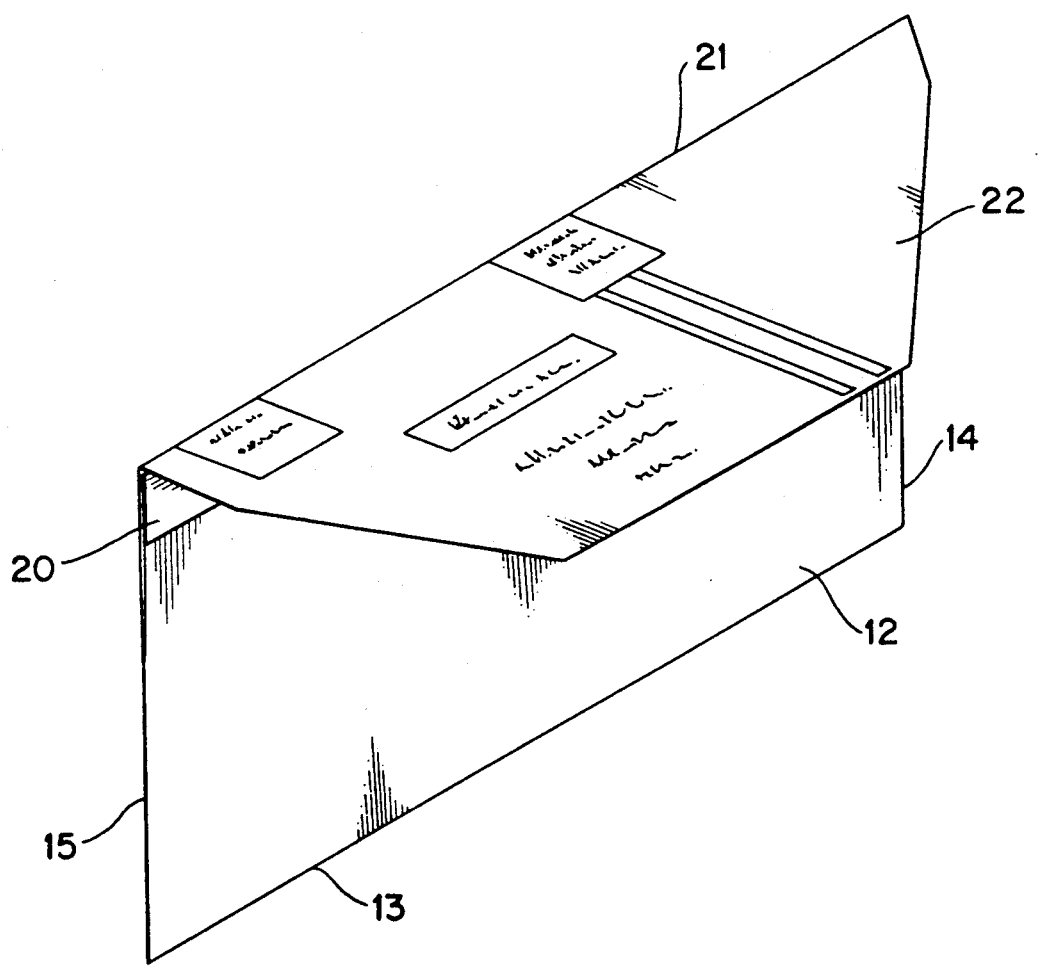
FIG. 5 is a perspective view of the reply envelope with the flap of the envelope open.

In order to reuse the envelope for reply purposes the second closure flap 22 is lifted out of the body portion of the envelope as shown in FIG. 5 and document(s) to be sent in return, for example a reply card or a cheque, are inserted into the body portion of the envelope. The envelope in use as a reply envelope is sealed by securing the gummed edge portion 23 of the second closure flap 22 to the face of the centre section 12.

Figure 6:
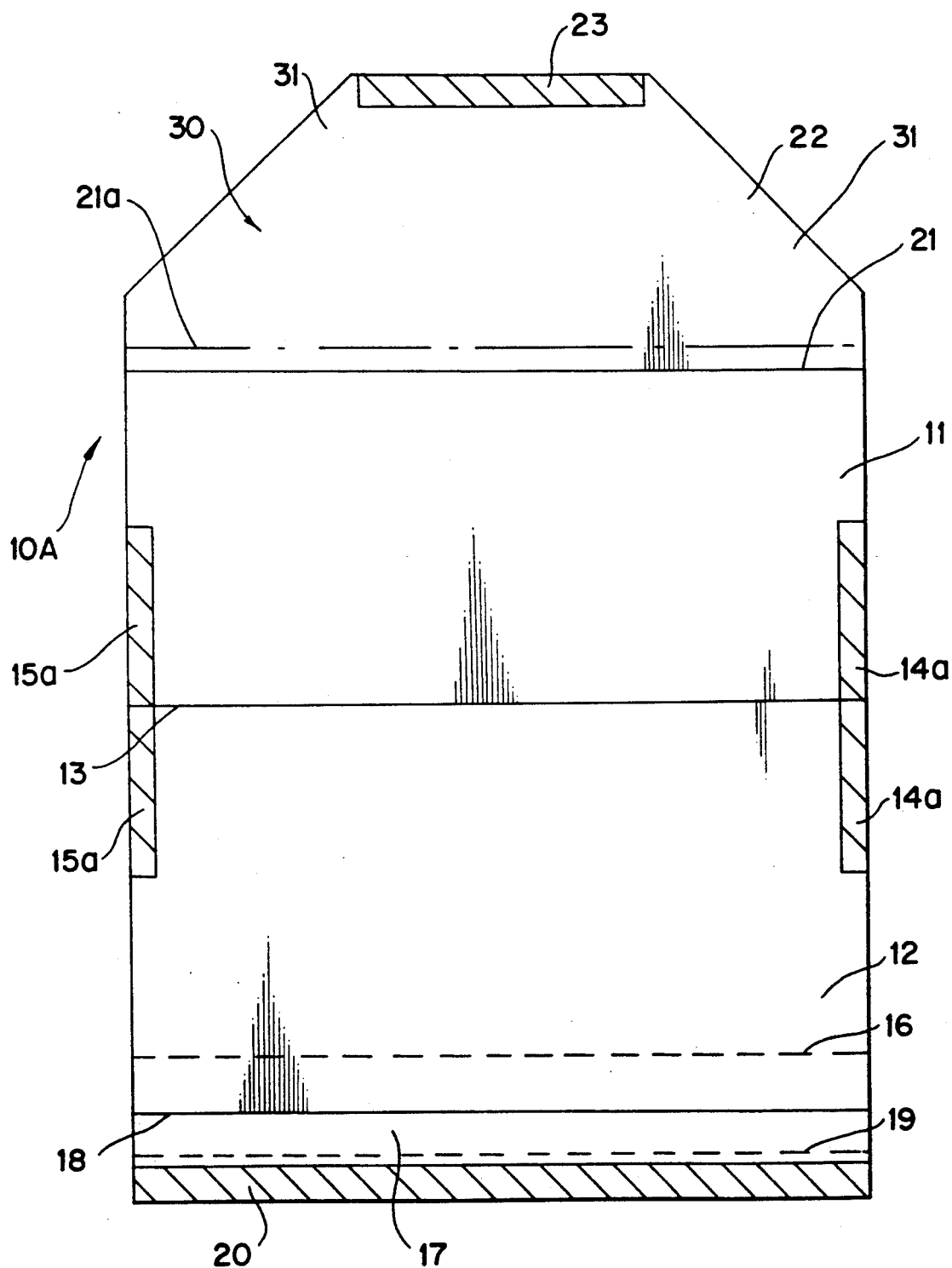
FIG. 6 is a plan view of a second paper blank from which an envelope of the present invention may be formed.

A second paper blank from which an envelope according to the present invention may be formed is illustrated in FIG. 6 of the accompanying drawings. The only difference between the paper blank 10 of FIG. 1 and the paper blank 10A of FIG. 6 is that the gummed flaps 14 and 15 of the first embodiment are placed by gummed portions 14a and 15a. In forming the envelope the gummed portions 14a and 15a are secured together instead of the folding and securing of flaps 14 and 15. In all other aspects the envelope of the second embodiment is formed and used in exactly the same manner as the envelope of the first embodiment.

An additional fold line indicated by broken line 21a in FIGS. 1 and 6 may be provided in the closure flap 22 adjacent to fold line 21 to enable the flap 22 to be readily used in various circumstances. For example, the additional fold line may be advantageous depending upon the thickness and/or weight of the material used in manufacture of the blank, or on the thickness and/or weight of the contents to be inserted in the envelope. Also, when the envelope is opened, the perforations 16, 19 may leave a minute strip of material proud of the original fold line 21 which may result in some difficulty in properly forming the reply envelope. In circumstances such as this, the closure flap 22 is folded about the additional fold line 21a to readily form the reply envelope.

It is also desirable that the closure flap 22 should be manufactured so as to cover the whole or as much as possible of the face of the centre section 12. This ensures that indicia which may have been applied to the face of the centre section 12 for example by certain post office and common carrier operating systems on the outward journey are not accessible to the operating system on the return journey. Further, depending upon the weight or thickness of the materials used in manufacturing, an ink point pattern or other suitable material may be affixed to the inside surface 30 of the closure flap 22 to render it substantially opaque. It will be appreciated that the side edges 31 of the cover flap 22 may have gummed regions (not shown) in addition to the gummed region 23. The flaps 14, 15, edge portion 20 of FIG. 1 or the portions 14a, 15a or edge portion 20 of the embodiment of FIG. 6 may have a soft glue applied in order to facilitate opening of the envelope to allow for contents inspection.

In the embodiment of FIG. 6, the gummed portions 14a and 15a may be secured together by an adhesive, a suitable chemical, by the application of heat or electronically welded or may be sewn together.

Figure 7:
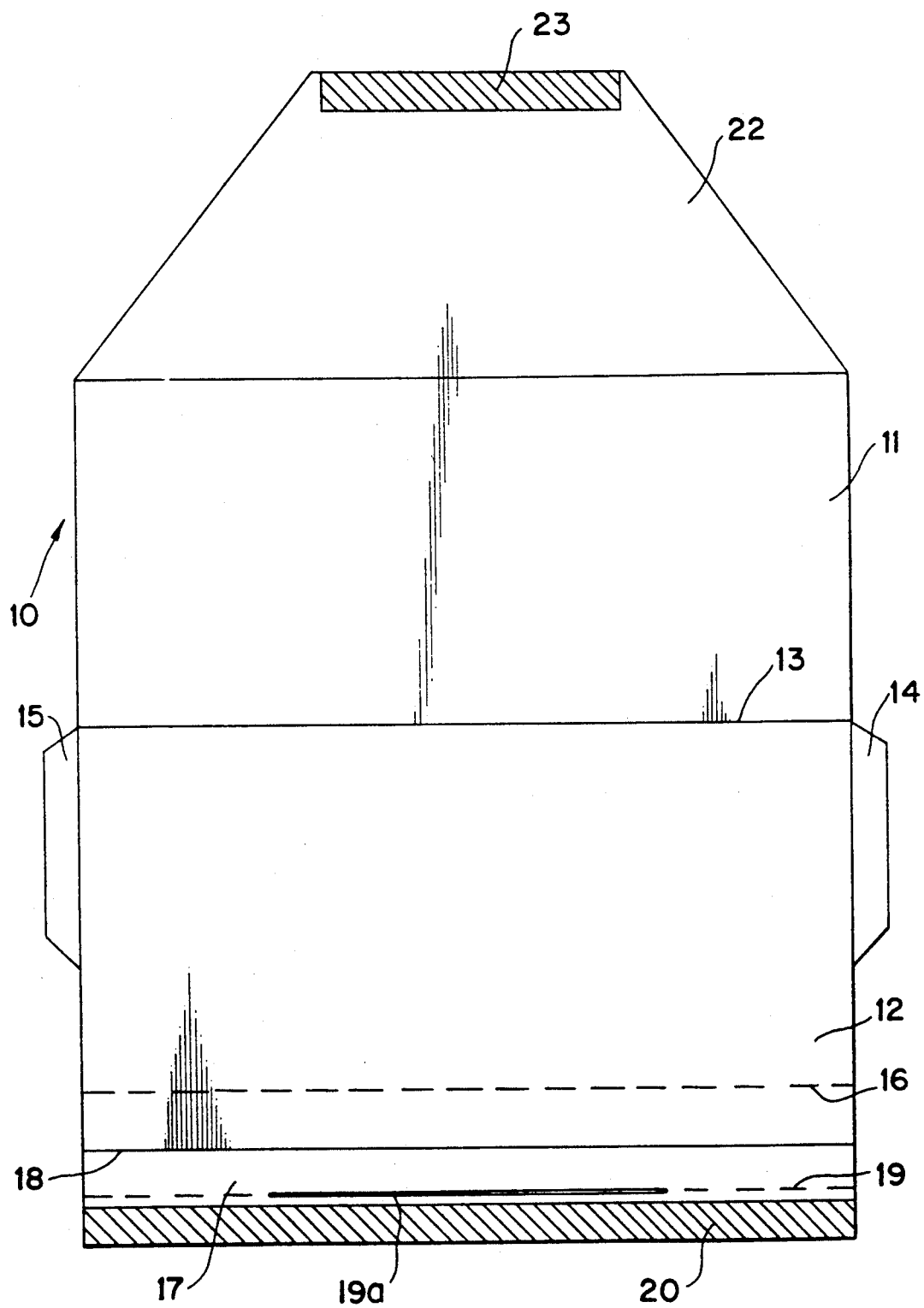
FIG. 7 is a plan view of a third paper blank from which an envelope of the present invention may be formed.

Referring to FIG. 7 of the accompanying drawings, a paper blank 10 from which an envelope is formed is shown. The blank 10 has two contiguous rectangular centre sections 11 and 12 divided by a fold line 13. The centre section 12 has on each of its shorter side edges a respective gummed flap 14 or 15. The longer edge of the centre section 12 remote from the fold line 13 is defined by a fold line 18 which divides the centre section 12 from a contiguous first closure flap 17 having a gummed portion 20 at its free edge. The longer edge of the centre section 11 remote from the fold line 13 is defined by a fold line 21 which divides the centre section 11 from a contiguous second closure flap 22 having a gummed portion 23 at its free edge.

Two lines 16 and 19 are provided one on either side of the fold line 18, the lines 16 and 19 being substantially parallel to and equally spaced from the fold line 18, and the line 16 being substantially the same distance from the fold line 13 as the fold line 21. The line 16 is a perforated line while the line 19 is perforated on each side of an open or slit portion 19a.

In forming an envelope from the paper blank 10 of FIG. 7, one follows the same steps as previously described in relation to forming an envelope from the paper blank of FIG. 1.

In order to partially seal contents into the body portion of the envelope, one simply folds the closure flap 17 about fold line 18 and presses down the gummed edge portion 20 to secure the portion 20 to the face of the centre section 11. The provision of the open or slit portion 19a provides access into the closed envelope and thereby renders the envelope an open envelope for postal purposes. This means the postage payable is less than the postage for the normal closed envelope.

Figure 8:
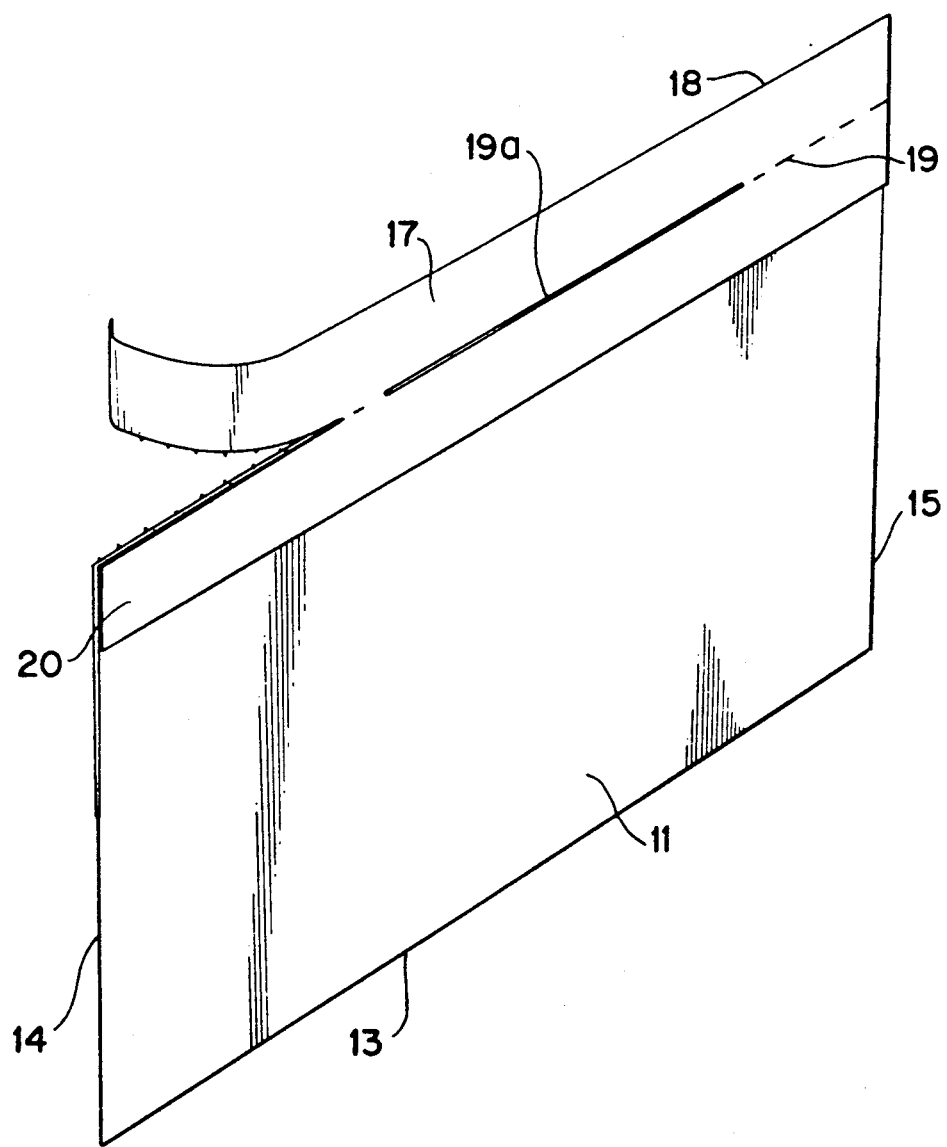
FIG. 8 is a perspective view of the sealed envelope formed from the blank of FIG. 7, with the envelope in a partially open position.

When the envelope is delivered, the addressee can open the envelope by tearing off the top of the envelope along the perforated line 16 and along the partially perforated and partially open line 19, 19a, as shown in FIG. 8.

In order to reuse the envelope for reply purposes, the second closure flap 22 is lifted out of the body portion of the envelope as shown in FIG. 5 and document(s) to be sent in return, for example a reply card and/or a cheque, are inserted into the body portion of the envelope. The envelope in use as a reply envelope is sealed by securing the gummed edge portion 23 of the second closure flap 22 to the face of the centre section 12.

Figure 9:
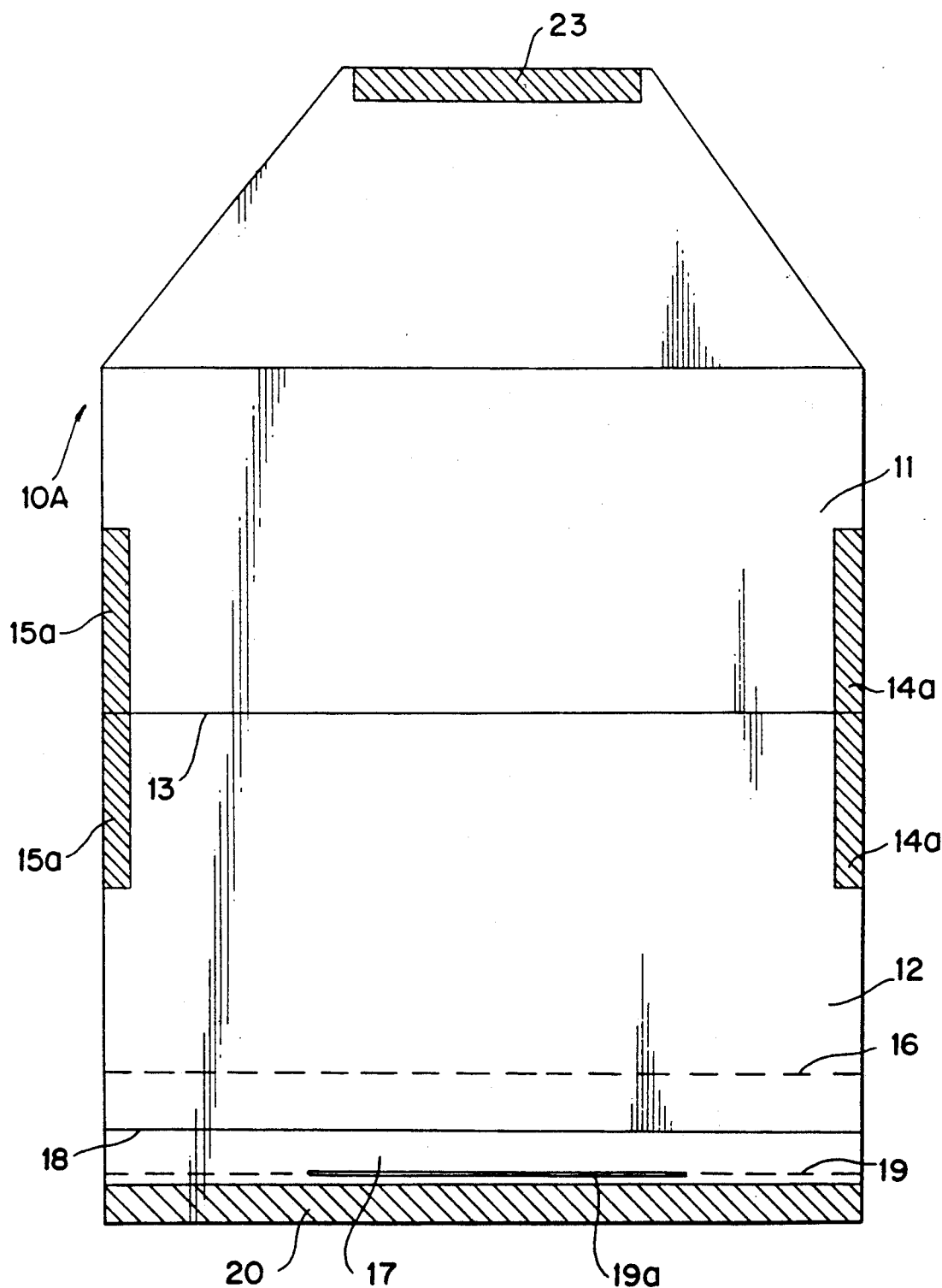
FIG. 9 is a plan view of a fourth paper blank from which an envelope may be formed.

A fourth paper blank from which an envelope according to the present invention may be formed is illustrated in FIG. 9 of the accompanying drawings. The only difference between the paper blank 10 of FIG. 1 and the paper blank 10A of FIG. 6 is that the gummed flaps 14 and 15 of the first embodiment are placed by gummed portions 14a and 15a. In forming the envelope, the gummed portions 14a and 15a are secured together instead of the folding and securing of flaps 14 and 15. In all other aspects, the envelope of the fourth embodiment is formed and used in exactly the same manner as the envelope of the previous embodiments.

As with the embodiment of FIG. 6, in the embodiment of FIG. 9, the gummed portions 14a and 15a may be secured together by an adhesive, a suitable chemical, by the application of heat or electronically welded or may be sewn together.

In the case of a large size envelope being required for heavy duty applications or in cases where the weight of the material used in the manufacture warrants, the lines of weakness may comprise lines of sewn in thread or string, rather than simply lines of perforations. It will be appreciated that depending upon the manufacture process applied, the envelope of the invention may be manufactured from one or two or more pieces of materials without departing from the scope of the invention.

It will be readily appreciated that an envelope according to the present invention provides an improved and more efficient method of using the reply envelope procedure. Since only one envelope is used, the cost of employing a reply envelope procedure is less expensive than the current procedure requiring the use of two separate envelopes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. An envelope comprising a contents-receiving body portion and first and second closure flaps, the second closure flap being foldable into the body portion, and the first closure flap being foldable about a fold line to close the body portion with the second closure flap accommodated therein, the envelope further comprising two lines of weakness respectively disposed one on either side of said fold line and being substantially parallel to and equally spaced from the fold line, the line of weakness nearest the free edge of the first closure flap having a central open portion whereby the envelope in a first use thereof is an open envelope, the body portion of the envelope being fully openable by tearing along the lines of weakness and the envelope being re-usable by lifting the second closure flap out of the body portion.

2. The envelope as claimed in claim 1, wherein the first and second center sections have adjacent side edges when folded one upon the other and the envelope further includes means for securing together at least part of the adjacent side edges.

3. The envelope as claimed in claim 1, further comprising adhesive means at free edges of the first and second closure flaps.

4. A blank for folding to form an envelope, comprising first and second contiguous centre sections divided by a first fold line along which one centre section may be folded over upon the other centre section to form a contents-receiving body portion of the envelope, a first closure flap contiguous with the first centre section and divided therefrom by a second fold line remote from the first fold line, two lines of weakness respectively disposed one on either side of the second fold line and being substantially parallel to and equally spaced from the second fold line, the line of weakness nearest the free edge of the first closure member having a central open portion and a second closure flap contiguous with the second centre section and divided therefrom by a third fold line remote from the first fold line.

5. The blank as claimed in claim 4, wherein the first and second centre sections have adjacent side edges when folded one upon the other and the blank further includes means for securing together at least part of the adjacent side edges.

6. The blank as claimed in claim 5, further including adhesive means at the free edges of the first and second closure flaps.

* * * * *